United States Patent [19]

Myhrman

[11] Patent Number: 4,646,398
[45] Date of Patent: Mar. 3, 1987

[54] DEVICE FOR LOCKING AN OBJECT AGAINST A STOP ON A SHAFT, BAR OR THE LIKE

[75] Inventor: Sören Myhrman, Norrköping, Sweden

[73] Assignee: Surtevall Trading AB, Norrköping, Sweden

[21] Appl. No.: 801,945

[22] Filed: Nov. 26, 1985

[30] Foreign Application Priority Data

Dec. 3, 1984 [SE] Sweden ................................. 8406107

[51] Int. Cl.⁴ .......................... A44B 21/00; B25G 3/00
[52] U.S. Cl. ........................................ 24/522; 24/524; 24/527; 272/123; 403/344
[58] Field of Search .................. 24/522, 523, 524, 525, 24/526, 527; 272/123; 403/344, 362

[56] References Cited

U.S. PATENT DOCUMENTS

| 697,404 | 4/1902 | Grundy | 24/524 |
| 709,366 | 9/1902 | Sexton | 403/344 |
| 2,244,351 | 6/1941 | Venables | 272/84 |
| 3,305,234 | 2/1967 | Cline et al. | 272/123 |
| 4,529,197 | 7/1985 | Gogarty | 272/123 |

FOREIGN PATENT DOCUMENTS

| 489929 | 1/1953 | Canada | 272/123 |
| 1230843 | 5/1971 | United Kingdom | |

Primary Examiner—Victor N. Sakran
Attorney, Agent, or Firm—Shapiro and Shapiro

[57] ABSTRACT

The present invention relates to a device for locking an object against a stop on a shaft, bar or the like. The device comprises a sleeve with a bore conformed to the shaft, and a ring movably connected to the sleeve in the axial direction and also having a bore conformed to the shaft. A member is arranged in the sleeve and adapted to act on the ring in such a manner that the ring is fixed in an inclined position relative to the shaft, and thereafter to move the sleeve away from the ring along the shaft so that the sleeve will urge the object against the stop.

6 Claims, 5 Drawing Figures

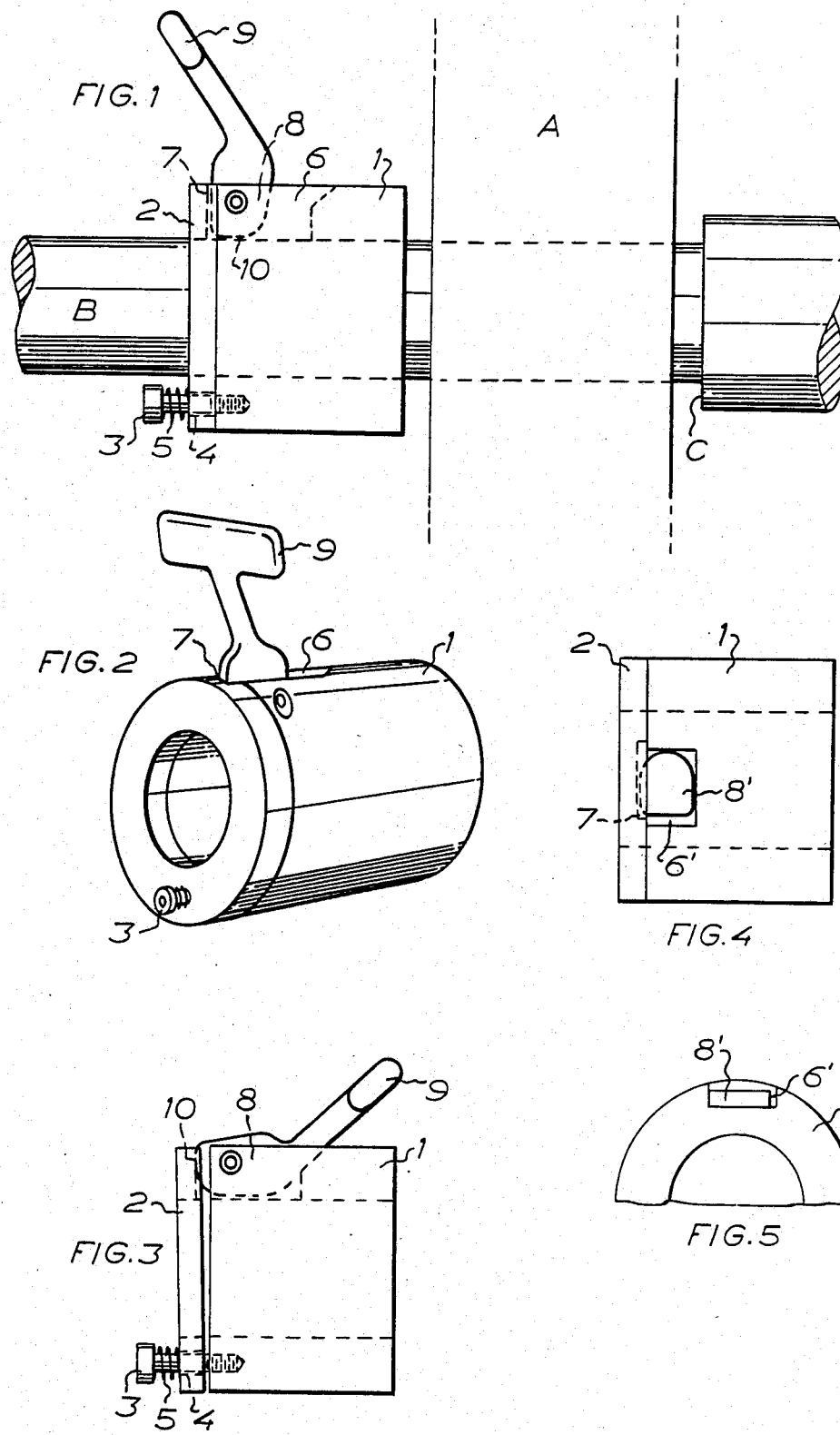

DEVICE FOR LOCKING AN OBJECT AGAINST A STOP ON A SHAFT, BAR OR THE LIKE

The present invention relates to a locking device for locking an object against a stop on a shaft, bar or the like. The invention relates in particular to a device for locking the weights on a bar bell, but is of course not restricted to this field of application but may be used whenever a quick and efficient locking device is needed.

It is previously known to use a locking device for a bar bell, which comprises a sleeve or locking ring with a radially extending screw or the like for locking the ring on the bar bell. This known device however suffers from the drawback that the weights are not efficiently pressed against each other and against the stop on the bar bell, such that there may exist a certain play, which is of course undesirable. In order to obviate this drawback, it has previously been suggested to use locking devices in the form of a split sleeve or the like which is secured on the bar by means of a screw assembly, whereupon a wing nut cooperating with the sleeve is adjusted to press the weights against the stop. This prior art device suffers from the drawback of being relatively complicated and requiring several time-consuming manual operations for locking and tightening.

The object of the invention thus is to overcome these drawbacks and provide an efficient and quick-acting locking device.

The invention will now be described in greater detail hereinbelow with reference to the accompanying drawing, in which FIG. 1 shows the locking device in the unlocked position, indicating an object to be locked against a stop on a shaft.

FIG. 2 is a perspective view of the device.

FIG. 3 shows the device in locking position.

FIGS. 4 and 5 illustrate in an alternative embodiment the location of a locking eccentric being part of the locking device.

In FIG. 1, reference letter A denotes an object to be locked against a stop C on a shaft B. The device according to the invention consists of a sleeve 1 and a ring 2 having a bore conformed to the shaft. The ring is retained to the sleeve by means of a screw 3 which is passed with a certain clearance through a hole 4 in the ring, and is urged against the sleeve by a spring 5. A locking cam 8 is mounted in a groove 6 in the sleeve and projects into a corresponding groove 7 in the ring. The locking cam is formed integrally with a handle 9.

To effect locking (FIG. 3), the handle 9 is pulled towards the object A and the stop C (to the right in the Figure), whereby the locking cam will first act on the ring 2 so as to incline it with respect to the sleeve 1. The ring is thus locked on the shaft (stick-slip effect). Continued pulling of the handle causes the sleeve to move away from the ring (to the right in the Figure), compressing the spring 5, and urging object A against the stop C. The locking cam 8 is suitably formed with a planar portion 10 which in the locking position engages the groove 7 in the ring such that the locking cam is maintained in this position.

FIGS. 4 and 5 illustrate an alternative embodiment of the locking cam. In this case, the grooves 6' and 7' in the sleeve and the ring, respectively, and the cam 8 are arranged perpendicularly in relation the preceding embodiment. The locking cam can be actuated by means of a stationary or loose handle, a hexagon socket key or the like (not shown).

Especially the embodiment according to FIGS. 1-3 has proved an extremely quick and efficient device for locking weights on bar bells. After the weights have been placed on the bar, the sleeve, held by the handle 9, is moved along the bar into engagement against the weights. A continued movement results in that the handle is lowered towards the weights and, hence, that the locking cam is actuated. The removal of the sleeve from the ring ensures that the weights will be efficiently pressed against each other and against the stop without the existence of any play.

The invention should of course not be considered restricted either to the field of application described above or to the illustrated embodiment but may be modified in various ways within the spirit and scope of the accompanying claims.

What I claim and desire to secure by Letters Patent is:

1. A device for locking an object against a stop on a shaft, bar or the like, comprising a sleeve with a bore conformed to the shaft, a ring movably connected to the sleeve in the axial direction and also having a bore conformed to the shaft, said ring being connected under spring load to the sleeve by means of a screw or the like fixed in the sleeve and extending with substantial clearance through a hole in said ring, and means in the sleeve for actuating said ring, said means including a cam which is located diametrically opposite said screw or the like in radial groove means in said sleeve and which projects into mating groove means in said ring, said cam being configured to act on said ring so as to fix said ring in an inclined position relative to the shaft and thereafter to move said sleeve away from said ring along the shaft such that said sleeve will press the object against the stop.

2. Device as claimed in claim 1, characterized in that said cam is provided with a planar portion which in a locked position of the device engages the groove means in the ring.

3. Device as claimed in claim 1, characterized in that the cam is fixedly connected to a handle and configured to act on the ring upon actuation of the handle in the direction of the stop.

4. A device for locking an object against a stop on a shaft, bar or the like, comprising a sleeve with a bore conformed to the shaft, a ring movably connected to the sleeve in the axial direction and also having a bore conformed to the shaft, said ring being connected under spring load to the sleeve by means of a screw or the like fixed in the sleeve and extending with substantial clearance through a hole in said ring, and means in the sleeve for actuating said ring, said means including a cam which is located diametrically opposite said screw or the like in tangential groove means in said sleeve and which projects into mating groove means in said ring, said cam being configured to act on said ring so as to fix said ring in an inclined position relative to the shaft and thereafter to more said sleeve away from said ring along the shaft such that said sleeve will press the object against the stop.

5. Device as claimed in claim 4, characterized in that the cam is adapted to be actuated by a separate handle and the like in order to act on the ring.

6. Device as claimed in claim 4, characterized in that said cam is provided with a planar portion which in a locked position of the device engages the groove in the ring.

* * * * *